United States Patent
Cao

(10) Patent No.: US 11,205,949 B2
(45) Date of Patent: Dec. 21, 2021

(54) DISCHARGE CIRCUIT AND METHOD

(71) Applicant: ZHENGZHOU YUNHAI INFORMATION TECHNOLOGY CO., LTD., Henan (CN)

(72) Inventor: Weihua Cao, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 295 days.

(21) Appl. No.: 16/475,102

(22) PCT Filed: Aug. 31, 2018

(86) PCT No.: PCT/CN2018/103407
§ 371 (c)(1),
(2) Date: Jun. 30, 2019

(87) PCT Pub. No.: WO2019/144620
PCT Pub. Date: Aug. 1, 2019

(65) Prior Publication Data
US 2020/0244156 A1    Jul. 30, 2020

(30) Foreign Application Priority Data
Jan. 25, 2018   (CN) .......................... 201810072554.0

(51) Int. Cl.
*H02J 7/00*  (2006.01)
*H02M 1/32*  (2007.01)

(52) U.S. Cl.
CPC .............. *H02M 1/32* (2013.01); *H02M 1/322* (2021.05)

(58) Field of Classification Search
USPC ........ 323/285, 288; 320/164, 165, 166, 167, 320/168
See application file for complete search history.

(56) References Cited

U.S. PATENT DOCUMENTS 5,627,460 A * 5/1997 Bazinet ................... G05F 1/618
   323/288
2011/0280053 A1   11/2011 Halberstadt
(Continued)

FOREIGN PATENT DOCUMENTS

| CN | 1882895 A | * | 12/2006 | .............. H02M 3/07 |
| CN | 100476672 C | * | 4/2009 | .............. H02M 3/07 |

(Continued)

OTHER PUBLICATIONS

The 1st Office Action dated Jun. 26, 2019 regarding the Chinese priority patent application No. CN201810072554.0.
(Continued)

*Primary Examiner* — Brian Ngo
(74) *Attorney, Agent, or Firm* — Yue (Robert) Xu; Apex Attorneys at Law, LLP

(57) ABSTRACT

A new discharge circuit and method are provided. The new discharge circuit includes: a voltage regulation chip; a discharge control circuit; a discharge switch circuit; a discharge bootstrap circuit; and an output circuit. An input voltage is regulated by the voltage regulation chip, and an output voltage of the voltage regulation chip is outputted to a load end via the output circuit. The voltage regulation chip is connected to the discharge switch circuit via the discharge control circuit. The output circuit is connected to the discharge switch circuit via the discharge bootstrap circuit.

5 Claims, 2 Drawing Sheets

(56) References Cited

U.S. PATENT DOCUMENTS

| | | | |
|---|---|---|---|
| 2013/0335038 A1 | 12/2013 | Lee et al. | |
| 2013/0335052 A1* | 12/2013 | Li | H02M 3/1563 323/285 |
| 2017/0040883 A1 | 2/2017 | Hu et al. | |
| 2018/0034450 A1* | 2/2018 | Zhao | H03K 3/3562 |

FOREIGN PATENT DOCUMENTS

| | | | |
|---|---|---|---|
| CN | 201928423 U | 8/2011 | |
| CN | 102244459 A | 11/2011 | |
| CN | 102437771 A | 5/2012 | |
| CN | 103138549 A | 6/2013 | |
| CN | 103516187 A | 1/2014 | |
| CN | 104753326 A | 7/2015 | |
| CN | 104953991 A | 9/2015 | |
| CN | 106452031 A | 2/2017 | |
| CN | 106877639 A | 6/2017 | |
| CN | 108322030 A | 7/2018 | |
| JP | 2011234481 A | 11/2011 | |

OTHER PUBLICATIONS

International Search Report for PCT/CN2018/103407 dated Dec. 5, 2018, ISA/CN.

\* cited by examiner

DISCHARGE CIRCUIT AND METHOD

The present application is the national phase of PCT International Patent Application PCT/CN2018/103407, filed on Aug. 31, 2018, which claims priority to Chinese Patent Application No. 201810072554.0, titled "NEW DISCHARGE CIRCUIT AND METHOD", filed on Jan. 25, 2018 with the Chinese Patent Office, both of which are incorporated herein by reference in their entireties.

FIELD

The present disclosure relates to the technical field of circuit designs, and in particular to a new discharge circuit and method.

BACKGROUND

The voltage regulation circuit plays an important role in the power supplying and provides a stable direct current power supply to the load, which protects the load against various factors such as variation in an input voltage, a size of an output load, and a temperature.

A voltage regulation circuit in the conventional technology is shown in FIG. 1. An input voltage is regulated by a voltage regulation chip and an output voltage of the voltage regulation chip is outputted to a load end via an output circuit including a capacitor.

However, no discharge circuit is provided in the voltage regulation chip in the conventional technology, and the discharge is performed almost completely based on parasitic parameters of the output capacitor at the back end, which results in slow discharge rate and long residual voltage duration and brings great harm to the system operation.

In view of the above, a new discharge circuit and method are provided in the present disclosure.

SUMMARY

In order to remedy drawbacks of the conventional technology, a new discharge circuit and method that are simple and efficient are provided in the present disclosure.

The following technical solutions are provided in the present disclosure.

A new discharge circuit is provided. The new discharge circuit includes a voltage regulation chip, a discharge control circuit, a discharge switch circuit, a discharge bootstrap circuit and an output circuit. An input voltage Vin is regulated by the voltage regulation chip, and an output voltage of the voltage regulation chip is outputted to a load end via the output circuit. The voltage regulation chip is connected to the discharge switch circuit via the discharge control circuit. The output circuit is connected to the discharge switch circuit via the discharge bootstrap circuit.

The discharge control circuit includes: a resistor R1, a resistor R2, an operational amplifier M1, an operational amplifier M2, and an AND gate U1. A positive input terminal of the operational amplifier M1 is connected to an Enable pin of the voltage regulation chip, and a negative input terminal of the operational amplifier M1 is connected between the resistor R1 and the resistor R2. A positive input terminal of the operational amplifier M2 receives the input voltage Vin, and a negative input terminal of the operational amplifier M2 receives the output voltage Vout. An output terminal of the operational amplifier M1 and an output terminal of the operational amplifier M2 are respectively connected to input terminals of the AND gate U1, and an output terminal of the AND gate U1 is connected to the discharge switch circuit.

The discharge bootstrap circuit includes: a diode D1, and a capacitor C1. An anode of the diode D1 receives the output voltage Vout, and a cathode of the diode D1 is connected to the discharge switch circuit via the capacitor C1.

The discharge switch circuit includes: a P-type MOS transistor Q1, and an N-type MOS transistor Q2. The discharge control circuit is connected to a gate electrode of the P-type MOS transistor Q1. The discharge bootstrap circuit is connected to a drain electrode of the P-type MOS transistor Q1. A gate electrode of the N-type MOS transistor Q2 is connected to a source electrode of the P-type MOS transistor Q1, a drain electrode of the N-type MOS transistor Q2 receives the output voltage Vout, and a source electrode of the N-type MOS transistor Q2 is grounded.

A discharge method, performed by the new discharge circuit described above is provided. The discharge method includes: detecting an Enable signal and the input voltage Vin and determining states of the Enable signal and the input voltage Vin by the discharge control circuit; controlling the discharge switch circuit by using the AND gate U1; performing charging by the discharge bootstrap circuit by using the output voltage Vout of the voltage regulation chip and maintaining, by the discharge bootstrap circuit, the output voltage Vout to drive the discharge switch circuit; outputting, by the AND gate U1, a high level to control the P-type MOS transistor Q1 to be turned off and control the discharge switch circuit not to operate, in a case that the Enable signal and the input voltage Vin are normal; and outputting, by the AND gate U1, a low level to control the P-type MOS transistor Q1 to be turned on and driving, by the discharge bootstrap circuit, the N-type MOS transistor Q2 via the P-type MOS transistor Q1 to output the output voltage Vout to a ground to complete a discharging process, in a case that the Enable signal or the input voltage Vin is abnormal or is normally cut off.

In the discharge control circuit, an effective value of the Enable signal is set by voltage division between the resistor R1 and the resistor R2; the effective value of the Enable signal is compared with a voltage of the Enable signal by the operational amplifier M1, and the operational amplifier M1 outputs a high level in a case that the voltage of the Enable signal is greater than the effective value of the Enable signal; and the input voltage Vin is compared with the output voltage Vout by the operational amplifier M2, and the operational amplifier M2 outputs a high level in a case that the input voltage Vin is greater than the output voltage Vout, wherein the AND gate U1 outputs the high level only in a case that that both the operational amplifier M1 and the operational amplifier M2 output a high level;

in the discharge bootstrap circuit, the discharge bootstrap circuit does not operate before the voltage regulation chip outputs the output voltage Vout; with increase of the output voltage Vout, the capacitor C1 is charged by using the output voltage Vout via the diode D1 until a voltage of the capacitor C1 is equal to the highest value of the output voltage Vout; and the voltage of the capacitor C1 is remained and is not decreased with the output voltage Vout after the charging process is completed;

in a case that the AND gate U1 outputs the high level, the P-type MOS transistor Q1 is turned off, and the discharge switch circuit does not operate; and in a case that the operational amplifier M1 or the operational amplifier M2 outputs a low level due to abnormity of the Enable signal and the input voltage Vin, the AND gate U1 outputs the low level to control the P-type MOS transistor Q1 to be turned on, and the N-type MOS transistor Q2 is driven by the capacitor C1 via the P-type MOS transistor Q1 to output the output voltage Vout to the ground to complete the discharging process.

The present disclosure has the following beneficial effects. With the new discharge circuit and method, a structure of the circuit is simple, an operation can be performed with no chip, and independence is high. The discharge control circuit performs automatic and flexible detection on a switching signal and the input voltage, the discharge bootstrap circuit maintains the voltage, and the discharge switch circuit is driven to ground an output end in a case that the switching signal or the input voltage is abnormal or is normally cut off, so that fast and complete discharge can be completed, which has high reliability and ensures safety and stability of the system operation.

Figure 1:
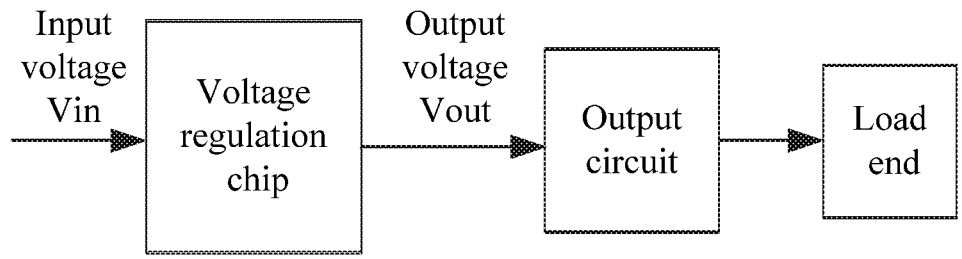
FIG. 1 is a schematic block diagram showing a voltage regulation circuit in the conventional technology.
Figure 2:
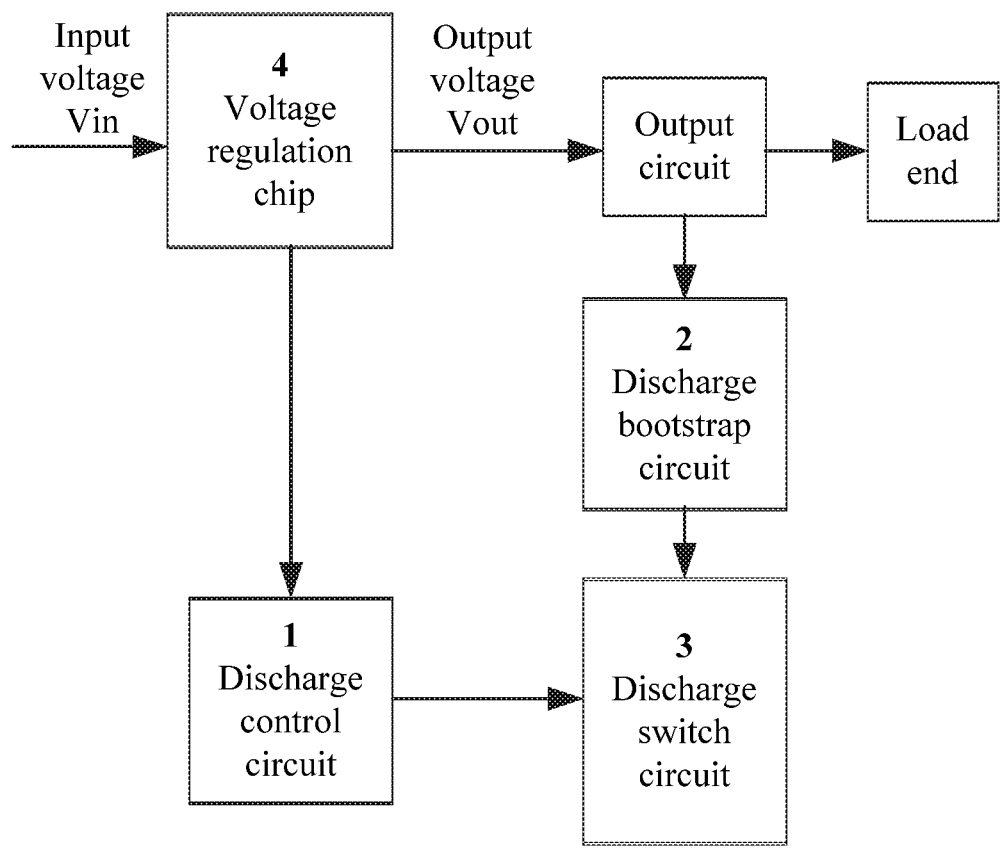
FIG. 2 is a schematic block diagram showing a new discharge circuit provided in the present disclosure.
Figure 3:
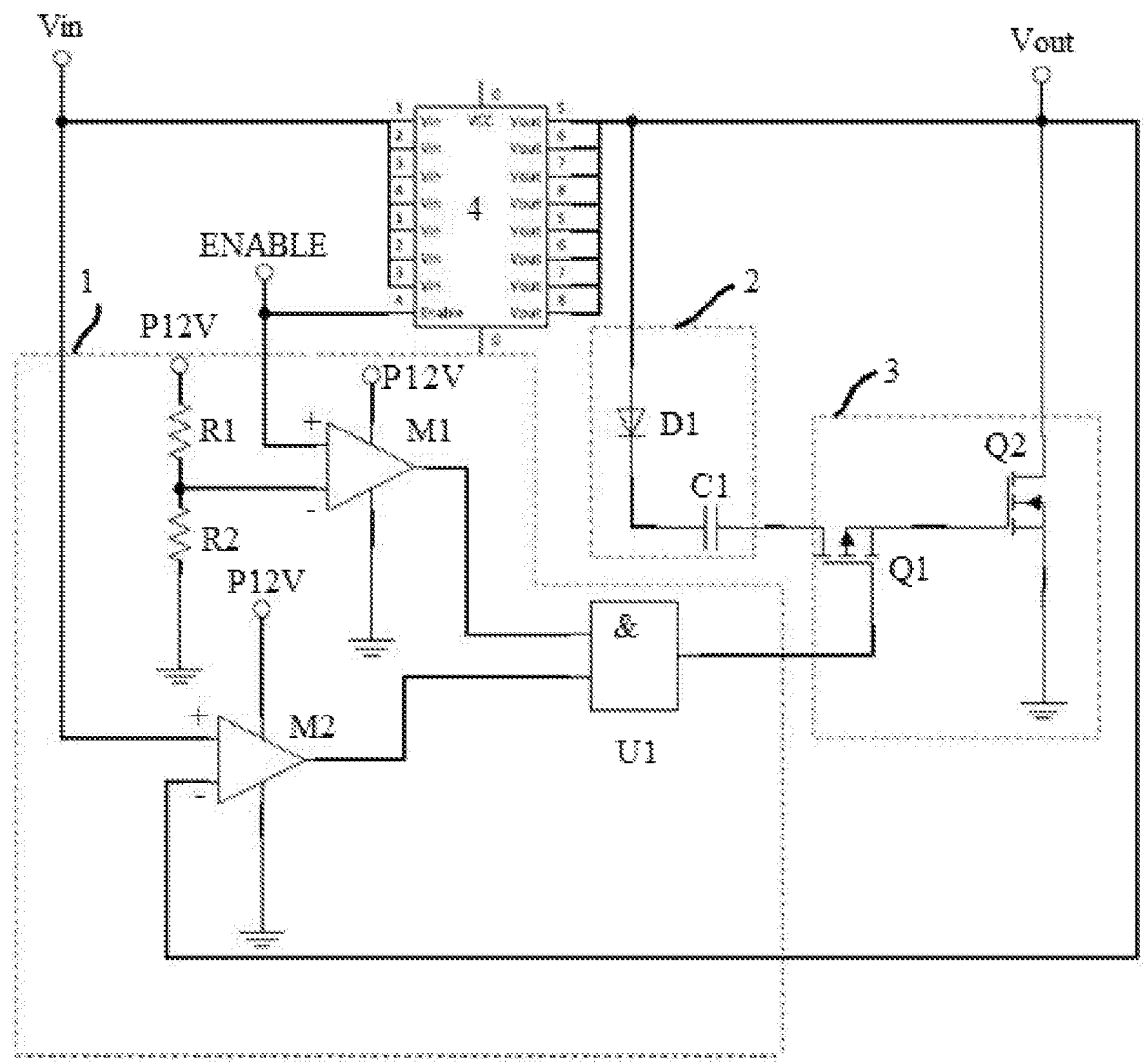
FIG. 3 is schematic structural diagram of the new discharge circuit provided in the present disclosure.

| Reference Numerals in Figures: | | | |
|---|---|---|---|
| 1 | a discharge control circuit, | 2 | discharge bootstrap circuit, |
| 3 | discharge switch circuit, | 4 | voltage regulation chip. |

DETAILED DESCRIPTION OF EMBODIMENTS

In order to make technical problems to be solved by the present disclosure, and technical solutions and beneficial effects of the present disclosure more clearly understood, the present disclosure is described in detail below with reference to embodiments. It should be noted that specific embodiments described herein are merely illustrative of the present disclosure and are not intended to limit the present disclosure.

A new discharge circuit is provided in the present disclosure. The new discharge circuit includes a voltage regulation chip, a discharge control circuit, a discharge switch circuit, a discharge bootstrap circuit and an output circuit. An input voltage Vin is regulated by the voltage regulation chip, and an output voltage of the voltage regulation chip is outputted to a load end via the output circuit. The voltage regulation chip is connected to the discharge switch circuit via the discharge control circuit. The output circuit is connected to the discharge switch circuit via the discharge bootstrap circuit.

The discharge control circuit includes: a resistor R1, a resistor R2, an operational amplifier M1, an operational amplifier M2, and an AND gate U1. A positive input terminal of the operational amplifier M1 is connected to an Enable pin of the voltage regulation chip, and a negative input terminal of the operational amplifier M1 is connected between the resistor R1 and the resistor R2. A positive input terminal of the operational amplifier M2 receives the input voltage Vin, and a negative input terminal of the operational amplifier M2 receives the output voltage Vout. An output terminal of the operational amplifier M1 and an output terminal of the operational amplifier M2 are respectively connected to input terminals of the AND gate U1, and an output terminal of the AND gate U1 is connected to the discharge switch circuit.

The discharge bootstrap circuit includes: a diode D1, and a capacitor C1. An anode of the diode D1 receives the output voltage Vout, and a cathode of the diode D1 is connected to the discharge switch circuit via the capacitor C1.

The discharge switch circuit includes: a P-type MOS transistor Q1, and an N-type MOS transistor Q2. The discharge control circuit is connected to a gate electrode of the P-type MOS transistor Q1. The discharge bootstrap circuit is connected to a drain electrode of the P-type MOS transistor Q1. A gate electrode of the N-type MOS transistor Q2 is connected to a source electrode of the P-type MOS transistor Q1, a drain electrode of the N-type MOS transistor Q2 receives the output voltage Vout, and a source electrode of the N-type MOS transistor Q2 is grounded.

A discharge method, performed by the new discharge circuit described above is provided in the present disclosure. The discharge method includes: detecting an Enable signal and the input voltage Vin and determining states of the Enable signal and the input voltage Vin by the discharge control circuit; controlling the discharge switch circuit by using the AND gate U1; performing charging by the discharge bootstrap circuit by using the output voltage Vout of the voltage regulation chip and maintaining, by the discharge bootstrap circuit, the output voltage Vout to drive the discharge switch circuit; outputting, by the AND gate U1, a high level to control the P-type MOS transistor Q1 to be turned off and control the discharge switch circuit not to operate, in a case that the Enable signal and the input voltage Vin are normal; and outputting, by the AND gate U1, a low level to control the P-type MOS transistor Q1 to be turned on and driving, by the discharge bootstrap circuit, the N-type MOS transistor Q2 via the P-type MOS transistor Q1 to output the output voltage Vout to a ground to complete a discharging process, in a case that the Enable signal or the input voltage Vin is abnormal or is normally cut off.

In the discharge control circuit, an effective value of the Enable signal is set by voltage division between the resistor R1 and the resistor R2; the effective value of the Enable signal is compared with a voltage of the Enable signal by the operational amplifier M1, and the operational amplifier M1 outputs a high level in a case that the voltage of the Enable signal is greater than the effective value of the Enable signal; and the input voltage Vin is compared with the output voltage Vout by the operational amplifier M2, and the operational amplifier M2 outputs a high level in a case that the input voltage Vin is greater than the output voltage Vout, wherein the AND gate U1 outputs the high level only in a case that that both the operational amplifier M1 and the operational amplifier M2 output a high level.

In the discharge bootstrap circuit, the discharge bootstrap circuit does not operate before the voltage regulation chip outputs the output voltage Vout; with increase of the output voltage Vout, the capacitor C1 is charged by using the output voltage Vout via the diode D1 until a voltage of the capacitor C1 is equal to the highest value of the output voltage Vout; and the voltage of the capacitor C1 is remained and is not decreased with the output voltage Vout after the charging process is completed.

In a case that the AND gate U1 outputs the high level, the P-type MOS transistor Q1 is turned off, and the discharge switch circuit does not operate. In a case that the operational amplifier M1 or the operational amplifier M2 outputs a low level due to abnormity of the Enable signal and the input voltage Vin, the AND gate U1 outputs the low level to control the P-type MOS transistor Q1 to be turned on, and the N-type MOS transistor Q2 is driven by the capacitor C1 via the P-type MOS transistor Q1 to output the output voltage Vout to the ground to complete the discharging process.

The invention claimed is:

1. A new discharge circuit, comprising:
a voltage regulation chip;
a discharge control circuit, comprising: a first resistor, a second resistor, a first operational amplifier, a second operational amplifier, and an AND gate;
a discharge switch circuit;
a discharge bootstrap circuit; and
an output circuit;
wherein an input voltage is regulated by the voltage regulation chip, and an output voltage of the voltage regulation chip is outputted to a load end via the output circuit;
wherein the voltage regulation chip is connected to the discharge switch circuit via the discharge control circuit;
wherein the output circuit is connected to the discharge switch circuit via the discharge bootstrap circuit;
wherein a positive input terminal of the first operational amplifier is connected to an Enable pin of the voltage regulation chip, and a negative input terminal of the first operational amplifier is connected between the first resistor and the second resistor;
wherein a positive input terminal of the second operational amplifier receives the input voltage, and a negative input terminal of the second operational amplifier receives the output voltage; and
wherein an output terminal of the first operational amplifier and an output terminal of the second operational amplifier are respectively connected to input terminals of the AND gate, and an output terminal of the AND gate is connected to the discharge switch circuit.

2. The new discharge circuit according to claim 1, wherein the discharge bootstrap circuit comprises: a diode, and a capacitor, wherein
an anode of the diode receives the output voltage, and a cathode of the diode is connected to the discharge switch circuit via the capacitor.

3. The new discharge circuit according to claim 1, wherein the discharge switch circuit comprises: a P-type MOS transistor, and an N-type MOS transistor, wherein
the discharge control circuit is connected to a gate electrode of the P-type MOS transistor;
the discharge bootstrap circuit is connected to a drain electrode of the P-type MOS transistor;
a gate electrode of the N-type MOS transistor is connected to a source electrode of the P-type MOS transistor, a drain electrode of the N-type MOS transistor receives the output voltage, and a source electrode of the N-type MOS transistor is grounded.

4. A discharge method, performed by the new discharge circuit according to claim 1, the discharge method comprising:

detecting an Enable signal and the input voltage and determining states of the Enable signal and the input voltage by the discharge control circuit;
controlling the discharge switch circuit by using an AND gate in the discharge control circuit;
performing charging by the discharge bootstrap circuit by using the output voltage of the voltage regulation chip and maintaining, by the discharge bootstrap circuit, the output voltage to drive the discharge switch circuit;
outputting, by the AND gate, a high level to control a P-type MOS transistor in the discharge switch circuit to be turned off and control the discharge switch circuit not to operate, in a case that the Enable signal and the input voltage are normal; and
outputting, by the AND gate, a low level to control the P-type MOS transistor to be turned on and driving, by the discharge bootstrap circuit, an N-type MOS transistor in the discharge switch circuit via the P-type MOS transistor to output the output voltage to a ground to complete a discharging process, in a case that the Enable signal or the input voltage is abnormal or is normally cut off.

5. The discharge method according to claim 4, wherein
in the discharge control circuit, an effective value of the Enable signal is set by voltage division between a first resistor and a second resistor; the effective value of the Enable signal is compared with a voltage of the Enable signal by a first operational amplifier, and the first operational amplifier outputs a high level in a case that the voltage of the Enable signal is greater than the effective value of the Enable signal; and the input voltage is compared with the output voltage by a second operational amplifier, and the second operational amplifier outputs a high level in a case that the input voltage is greater than the output voltage, wherein the AND gate outputs the high level only in a case that that both the first operational amplifier M1 and the second operational amplifier output a high level;
in the discharge bootstrap circuit, the discharge bootstrap circuit does not operate before the voltage regulation chip outputs the output voltage; with increase of the output voltage, a capacitor is charged by using the output voltage via a diode until a voltage of the capacitor is equal to the highest value of the output voltage; and the voltage of the capacitor is remained and is not decreased with the output voltage after the charging process is completed;
in a case that the AND gate outputs the high level, the P-type MOS transistor is turned off, and the discharge switch circuit does not operate; and
in a case that the first operational amplifier or the second operational amplifier outputs a low level due to abnormity of the Enable signal and the input voltage, the AND gate outputs the low level to control the P-type MOS transistor to be turned on, and the N-type MOS transistor is driven by the capacitor via the P-type MOS transistor to output the output voltage to the ground to complete the discharging process.

* * * * *